United States Patent
Heine

[11] 3,728,998
[45] Apr. 24, 1973

SUBSTITUTE FOR MISSING XR

[54] OTOSCOPE

[75] Inventor: Helmut A. Heine, Herrsching/Obb, Germany

[73] Assignees: Optotechnik G.m.b.H., Germany; Propper Manufacturing Company, Inc., Long Island City, N.Y.

[22] Filed: Jan. 26, 1971

[21] Appl. No.: 108,704

[52] U.S. Cl. .................................................. 128/9
[51] Int. Cl. ............................................... A61b 1/22
[58] Field of Search .................. 128/9, 6; 350/96 B

[56] References Cited

UNITED STATES PATENTS

| | | | |
|---|---|---|---|
| 3,278,738 | 10/1966 | Clark | 128/6 UX |
| 1,618,970 | 3/1927 | De Zeng | 128/9 |
| 3,384,076 | 5/1968 | Speelmen | 128/9 |
| 3,417,746 | 12/1968 | Moore et al. | 128/6 |
| 3,556,086 | 1/1971 | Gordon | 128/22 |
| 3,373,737 | 3/1968 | Moore et al. | 128/9 |

FOREIGN PATENTS OR APPLICATIONS

| | | | |
|---|---|---|---|
| 1,026,208 | 4/1966 | Great Britain | 128/9 |

Primary Examiner—Lucie H. Laudenslager
Attorney—Blum, Moscovitz, Friedman & Kaplan

[57] ABSTRACT

An improved otoscope construction utilizing fiber optics light transmission in which the fiber optic-carrying portion is fabricated as a separate and unitary member for assembly with additional component parts which, when combined, form an otoscope head.

4 Claims, 5 Drawing Figures

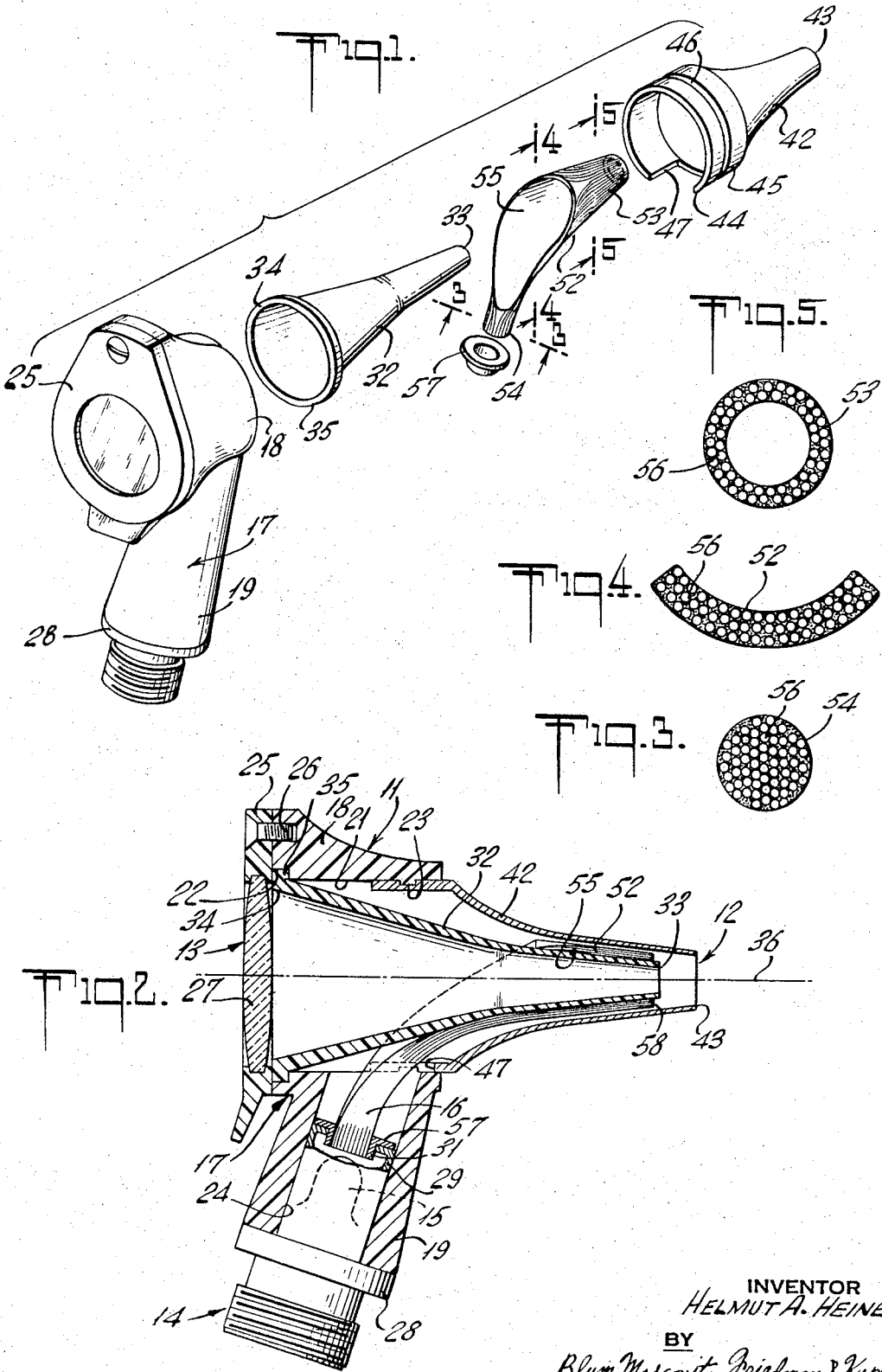

OTOSCOPE

BACKGROUND OF THE INVENTION

This invention relates generally to the improved construction of an otoscope or otoscope head. Otoscopes have long been known in the art and are generally used by physicians for examining cavities of the human body. Otoscopes permit the physician to view through a sight opening while illuminating the portion of the cavity to be viewed. With the development of the art of fiber optics, it has been possible to remove the illuminating bulb from the line of sight as the light-transmitting optical fibers are capable of bending light around corners and curves. Otoscopes have been developed which deliver light from an annulus surrounding the sight passage with the light input source being located remote from the passage defining the viewing opening.

However, the fabrication of fiber optic otoscopes has proven somewhat complex, requiring costly fabrication techniques. In view of the complexities of molding a fiber optic unit, difficulties have been encountered in fabricating otoscope heads at reasonable cost, especially in smaller sizes.

SUMMARY OF THE INVENTION

Generally speaking, in accordance with the invention, the various housing portions of an otoscope are fabricated wholly separate from the unit carrying the optical fibers and the optical fiber-carrying unit is fabricated separately for subsequent assembly with the remaining parts.

Accordingly, it is an object of this invention to provide an otoscope of improved construction.

Another object of this invention is to provide an improved otoscope in which the unit carrying the optical fibers is wholly separate from the housing components.

A further object of the invention is to provide an otoscope of improved construction in which the optical fiber-carrying portion is located wholly within housing members and is thereby fully protected after assembly.

Still other objects and advantages of the invention will in part be obvious and will in part be apparent from the specification.

The invention accordingly comprises an article of manufacture possessing the features, properties, and the relation of elements which will be exemplified in the article hereinafter described, and the scope of the invention will be indicated in the claims.

BRIEF DESCRIPTION OF THE DRAWING

For a fuller understanding of the invention, reference is had to the following description taken in connection with the accompanying drawing, in which:

FIG. 1 is an exploded perspective view of an otoscope constructed in accordance with a preferred embodiment of the instant invention;

FIG. 2 is a sectional elevational view of the assembled components of FIG. 1;

FIG. 3 is a sectional view taken along line 3—3 of FIG. 1;

FIG. 4 is a sectional view taken along 4—4 of FIG. 1; and

FIG. 5 is a sectional view taken along line 5—5 of FIG. 1.

DESCRIPTION OF THE PREFERRED EMBODIMENT

Referring first to FIG. 2, an otoscope 11 has a distal end 12 and a proximal end 13 and a base end 14. The distal end, in use, is positioned proximate the part of the body to be examined and the proximal end is the end through which the physician looks during examination. The proximal end of a medical instrument is generally regarded as the end proximate the physician or operator. The base end mounts to a battery handle or other suitable device which powers the illuminating bulb indicated by dotted lines at 15. A bundle of optical fibers 16 transmit the light from bulb 15 to the distal end for illumination of the part of the body which the physician wishes to examine.

Referring to FIGS. 1 and 2, a support member or body 17, which may be molded of plastic material, has an upper end 18 and a lower end 19. Upper end 18 has the general external configuration of a truncated cone and is formed with a generally cylindrical passage 21 therethrough. The wall defining cylindrical passage 21 has an annular undercut 22 at the proximal end and a projecting ridge 23 remote from the proximal end. Extending downwardly from upper end 18 is lower end 19 which has the general configuration of a truncated cone and a generally cylindrical through passage 24 which communicates with cylindrical passage 21.

If desired, a support plate 25 may be pivoted to upper end 18 by means of screw 26 to position a magnifying lens 27 over the proximal end of the otoscope for use in magnifying the portion of the body being viewed by the physician. Support plate 25 is pivotable so that magnifying lens 27 may be selectively used or not. Magnifying lenses in otoscopes are commonly known.

Mounted at the terminus of lower end 19 is a connector 28 of any suitable construction by which the otoscope is connected to a power source or light source. If the otoscope is of the type having the bulb 15 in the head, the connector would be used to connect the otoscope head to a battery handle or other suitable source (not shown).

Cylindrical passage 24 mounts therein a collar 29 having an annular aperture 31 whose use will be hereafter described. Collar 29 may be of sufficient length to mount and make electrical contact with bulb 15.

An inner cone 32 has a distal end 33 of relatively small diameter and a proximal end 34 of substantially larger diameter. Proximal end 34 also carries an annular flange 35 for cooperation with annular undercut 22 to mount and locate inner cone 32 within upper end 18. The clear passage through inner cone 32 defines the sight axis 36 through which the physician views from the proximal to the distal end of the instrument. Inner cone 32 may be formed of plastic material and cemented or otherwise securely affixed to upper end 18.

An outer cone 42 has a distal annular end 43 and a proximal end 44. Extending from distal end 43, outer cone 42 has the general configuration of a truncated cone. However, a short length of outer cone 42 commencing at proximal end 44 has a generally cylindrical configuration 45 which is formed with an annular undercut 46 with the outside diameter of the cylinder 45 being substantially that of the inner diameter of cylindrical passage 21 in the upper end of body 17. Ridge 23 cooperates with annular undercut 46 to retain outer cone 42 in mounted relationship with upper end 18.

The cylindrical portion 45 of outer cone 42 is interrupted by a cut-out portion 47 oriented, in the assembly of FIG. 2, to be at the area of communication between cylindrical passage 24 and cylindrical passage 21 for a use to become hereafter evident. Outer cone 42 may be formed of any suitable material, such as plastic or metal. It is considered preferable to form outer cone 42 with the thinnest possible wall if it is desired to mount removable specula (not shown) thereon while minimizing bulk.

A fiber moldment 52 is generally positioned intermediate inner cone 32 and outer cone 42. The fiber moldment has a main body portion 53 of a generally cone-shaped configuration which merges, at one end, with an angularly-extending cylindrical portion 54. The main body portion is hollow and defines a through passage 55. The fiber moldment 52 consists of a plurality of light-transmitting fibers 56, molded into a supporting mass of material, preferably plastic, which defines the fiber moldment 52. The ends of the fibers at cylindrical portion 54 comprises a solid circular mass of fiber ends as shown in FIG. 3. The ends of the fibers in the main body portion comprises an annular mass as shown in FIG. 5. The transition from the circular bundle shown in FIG. 3 to the annular bundle shown in FIG. 5 is accomplished by a spreading out of the fibers while being positioned for molding and a typical cross-section of a portion of the transition is shown in FIG. 4.

Stated otherwise, a bundle of fibers is arranged so that the ends of the fibers at one end of the bundle is in the form of a solid mass, while the ends of the fibers at the other end of the bundle forms an annulus. The bundle, so positioned, is encapsulated and held in position by a moldment, preferably a plastic moldment, so that a self-supporting unit, as indicated generally at 52 in FIG. 1, is formed. In accordance with known technology, the ends of the light-transmitting fibers should be ground smooth for the best transmission of light.

A collar 57 may be mounted on cylindrical portion 54 for mounting the cylindrical portion in collar 29.

As can best be seen in FIG. 2, fiber moldment 52 has its cylindrical end located within the base end 14 of the otoscope. The fiber moldment extends into the cylindrical passage 21 in body 17, passing through cut-out portion 47 of outer cone 42. The moldment curves toward the distal end of the otoscope and is located in the annular space between inner cone 32 and outer cone 42. A close fit between the distal end 58 of the fiber moldment, the distal end 33 of inner cone 32 and the inner wall of outer cone 42, rigidly mounts the light-transmitting fibers in place. In the preferred construction, both the distal end 33 of the inner cone and the distal end 58 of the fiber moldment are recessed within the distal end 43 of the outer cone, thereby preventing damage to the ends of the light-transmitting fibers 56 in the event that the instrument is dropped. Also, it is preferred that the distal end 33 of inner cone 32 extend beyond the proximal end 58 of the fiber moldment to further protect against damage to the smooth ends of the fibers, especially if foreign objects are poked into the distal end of the instrument.

As can be seen, the fiber moldment performs no function in the assembled instrument other than to support and locate the optical or light-transmitting fibers. The inner surface of the sight passage is defined by the inner surface of inner cone 32. Thus, when the physician is using the otoscope as an operating otoscope and passing instruments therethrough, any scratching of the surface of inner cone 32 will have no effect on the bundle of light-transmitting fibers.

The external supports and protective external portions of the instrument are defined by the support member or body 17 and outer cone 42.

To recapitulate, in use, light from a source such as bulb 15 illuminates the ends of the fibers as shown in FIG. 3 and an annular beam of light is transmitted from the proximal ends of the fibers as represented by FIG. 5. The physician inserts the proximal end of the instrument into a body cavity and views along sight passage 36, either with or without magnifying lens 27. The physician's view is unobstructed while the portion of the body being viewed is illuminated by the light emanating from the distal end of the light-transmitting fibers.

It will thus be seen that the objects set forth above, among those made apparent from the preceding description, are efficiently attained, and, since certain changes may be made in the above article without departing from the spirit and scope of the invention, it is intended that all matter contained in the above description and shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An otoscope comprising a support body having an upper end and having the general configuration of a truncated cone with a cylindrical passage therethrough and a lower end having the general configuration of a truncated cone with a cylindrical passage therethrough, the lower end being disposed at an angle to the upper end, a substantially rigid optical fiber moldment, one end of said moldment comprising a circular mass of fiber ends, the other end of said moldment comprising an annulus of fiber ends extending at an angle to said circular end, the angle between said moldment ends being substantially equal to the angle between said upper and lower ends of said support body, said circular end of said moldment being removably seated within said cylindrical passage of said lower end, and inner and outer members of substantially conical shape, the narrow end of said inner member being removably disposed within the annular end of said moldment, said outer member being disposed around said moldment and inner member, said outer member being removably seated in said cylindrical passage in said upper end of said support body.

2. An otoscope as claimed in claim 1 wherein the narrow end of said inner member, when disposed within the annular end of said moldment extends beyond the outer end of the annular end of said moldment.

3. An otoscope as claimed in claim 2 wherein the narrow end of said outer member, when disposed around said moldment and said inner member extends beyond the ends of said inner member and said moldment.

4. An otoscope as claimed in claim 1 wherein said circular end of said moldment is positioned within said cylindrical passage at a distance from the lower end of said support body, said distance being sufficient to receive an illuminating bulb within said cylindrical passage of said lower end.

* * * * *